(12) United States Patent
Zhao

(10) Patent No.: US 9,696,820 B2
(45) Date of Patent: Jul. 4, 2017

(54) POSITION INDICATION DEVICE AND POSITION INDICATION METHOD

(75) Inventor: Liang Zhao, Beijing (CN)

(73) Assignee: Hanvon Pentech Co., Ltd., Beijing (CN)

( * ) Notice: Subject to any disclaimer, the term of this patent is extended or adjusted under 35 U.S.C. 154(b) by 377 days.

(21) Appl. No.: 14/270,720

(22) PCT Filed: May 30, 2012

(86) PCT No.: PCT/CN2012/076267
§ 371 (c)(1),
(2), (4) Date: May 6, 2014

(87) PCT Pub. No.: WO2013/067810
PCT Pub. Date: May 16, 2013

(65) Prior Publication Data
US 2015/0324017 A1    Nov. 12, 2015

(30) Foreign Application Priority Data
Nov. 11, 2011 (CN) .......................... 2011 1 0358211

(51) Int. Cl.
*G06F 3/033* (2013.01)
*G06F 3/0354* (2013.01)
(Continued)

(52) U.S. Cl.
CPC .......... *G06F 3/03545* (2013.01); *G06F 3/044* (2013.01); *G06F 3/046* (2013.01); *G06F 3/0418* (2013.01)

(58) Field of Classification Search
CPC .... G06F 3/03545; G06F 3/0418; G06F 3/044; G06F 3/046
See application file for complete search history.

(56) References Cited

U.S. PATENT DOCUMENTS 3,624,446 A * 11/1971 Goldberg ................ H02M 3/28
307/110
4,785,387 A * 11/1988 Lee .......................... H02M 3/28
363/131

(Continued)

FOREIGN PATENT DOCUMENTS

| CN | 101604918 A | 12/2009 |
| CN | 201724996 U | 1/2011 |

OTHER PUBLICATIONS

International Search Report dated Sep. 13, 2012, in International Patent Application No. PCT/CN2012/076267, filed May 30, 2012, 2 pages.

(Continued)

*Primary Examiner* — Amare Mengistu
*Assistant Examiner* — Crystal A Mathews
(74) *Attorney, Agent, or Firm* — Davis Wright Tremaine LLP; Michael J. Donohue

(57) ABSTRACT

The present invention relates to digital circuit processing and provides a position indication device and a position indication method. In order to improve positioning accuracy of the position indication device without degrading its sensitivity, a position indication device is provided. The device comprises: a voltage dividing circuit connected with a resonant circuit and a rectifying and filtering circuit. The voltage dividing circuit obtains a predetermined proportion of a signal output from the resonant circuit and outputs it to the rectifying and filtering circuit. The present invention is applicable to digital handwriting pens.

4 Claims, 4 Drawing Sheets

(51) Int. Cl.
  *G06F 3/044* (2006.01)
  *G06F 3/041* (2006.01)
  *G06F 3/046* (2006.01)

(56) References Cited

U.S. PATENT DOCUMENTS

| | | | | |
|---|---|---|---|---|
| 5,065,301 A * | 11/1991 | Shioya | ................ | H02M 3/3376 333/175 |
| 5,072,180 A * | 12/1991 | Moreau | ................ | H03K 17/14 324/207.12 |
| 5,075,836 A * | 12/1991 | Suzuki | ................ | H02M 3/3376 363/17 |
| 5,218,174 A * | 6/1993 | Gray | ................ | G06F 3/046 178/19.03 |
| 5,386,359 A * | 1/1995 | Nochi | ................ | H02M 3/33561 323/282 |
| 5,854,881 A * | 12/1998 | Yoshida | ................ | G06F 3/0412 178/18.07 |
| 8,022,317 B2 * | 9/2011 | Ely | ................ | G06F 3/03545 178/18.03 |
| 2003/0090366 A1 * | 5/2003 | Tsai | ................ | G06K 7/0008 340/10.1 |
| 2005/0043918 A1 * | 2/2005 | Katsurahira | ................ | G06F 1/3203 702/178 |
| 2006/0131428 A1 * | 6/2006 | Wang | ................ | G06K 19/0701 235/492 |
| 2009/0057416 A1 * | 3/2009 | Kato | ................ | G06K 19/0701 235/492 |
| 2009/0167208 A1 * | 7/2009 | Doroshev | ................ | H02J 1/10 315/294 |
| 2010/0276214 A1 * | 11/2010 | Liu | ................ | G06F 3/046 178/18.03 |
| 2010/0302817 A1 * | 12/2010 | Usui | ................ | H02M 3/3376 363/21.17 |
| 2011/0051465 A1 * | 3/2011 | Usui | ................ | H02M 3/337 363/21.02 |
| 2011/0103112 A1 * | 5/2011 | Jiang | ................ | H02M 3/33507 363/125 |
| 2011/0149607 A1 * | 6/2011 | Jungreis | ................ | H02M 3/3376 363/21.02 |
| 2011/0181364 A1 * | 7/2011 | Ahadian | ................ | H03F 1/301 330/290 |
| 2011/0248655 A1 * | 10/2011 | Buchmann | ................ | H02M 3/337 318/293 |
| 2011/0297458 A1 * | 12/2011 | Mao | ................ | G06F 3/03545 178/19.04 |
| 2012/0154340 A1 * | 6/2012 | Vuppu | ................ | G06F 3/044 345/179 |
| 2013/0208393 A1 * | 8/2013 | Hampton | ................ | F02P 9/002 361/247 |

OTHER PUBLICATIONS

State Intellectual Property Office of the P.R. China; International Search Report; Sep. 13, 2012; Beijing, P.R. China.

* cited by examiner

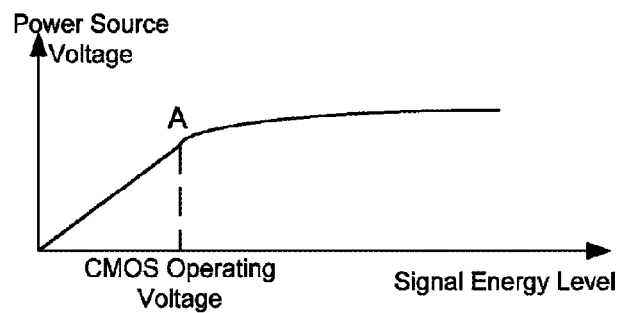
Fig. 2    (PRIOR ART)
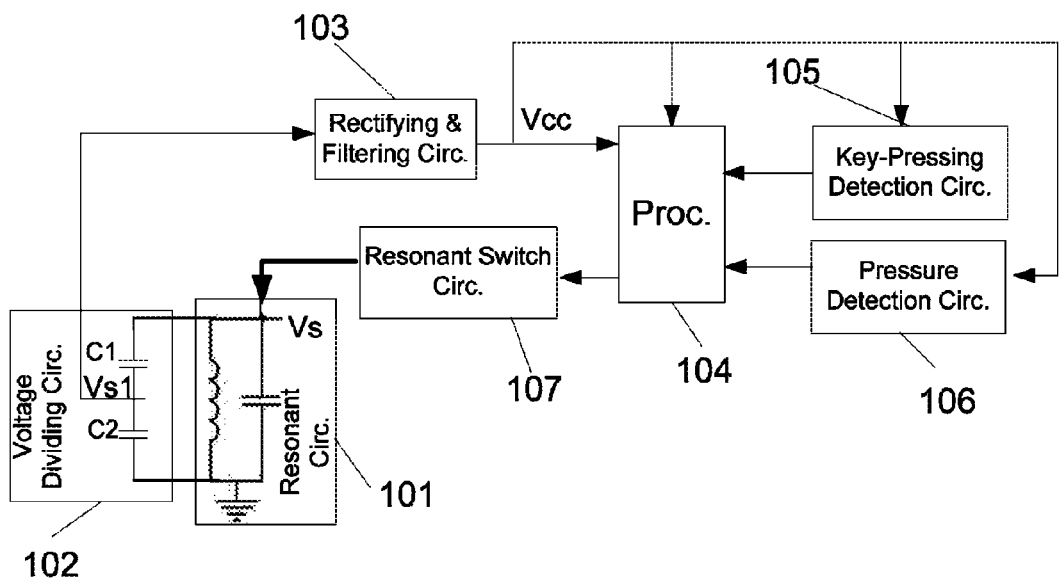
Fig. 3

POSITION INDICATION DEVICE AND POSITION INDICATION METHOD

TECHNICAL FIELD

The present invention relates to digital circuit processing, and more particularly, to a position indication device and a position indication method.

BACKGROUND

Electric-Magnetic (EM) inductive handwriting input technique has become widespread in practice. An EM inductive handwriting input device typically includes an EM handwriting pen and an EM position detection input device. Further, based on the relationship between the handwriting pen and the position detection input device, handwriting input devices can be divided into wired EM handwriting input devices, wireless active handwriting input devices and wireless passive handwriting input devices, among which the wireless passive handwriting input devices are most convenient and popular. A wireless passive handwriting pen includes a resonant circuit consisting of an inductor and a capacitor and capable of oscillating in response to sensing a signal transmitted from a position detection input device. Then, a receiver circuit of the position detection device receives an oscillation signal generated by the resonant circuit, such that the position of the handwriting pen relative to the position detection input device can be obtained.

Further, wireless passive handwriting input devices can be sub-divided into analog handwriting input devices and digital handwriting input devices. Compared with analog handwriting input devices, digital handwriting input devices are advantageous in their capabilities of accurately detecting and transmitting pressure information and of detecting and transmitting more key-pressing information for handwriting pens. Digital handwriting pens are provided with CMOS logic circuits and some digital handwriting pens are further provided with processors. FIG. 1 shows a circuit block diagram of an existing digital handwriting pen. In this digital handwriting pen, an oscillation signal generated by a resonant circuit is rectified and filtered and the resulting power source is used to supply power to the circuit of the digital handwriting pen.

In order to improve the detection accuracy of input position of a handwriting pen, a signal amplitude of the handwriting pen needs to be increased, i.e., a voltage amplitude of the oscillation signal generated by the resonant circuit needs to be increased. Currently, the energy of the signal generated by the resonant circuit in the handwriting pen is typically increased by increasing the energy of the signal transmitted by the position detection input device, thereby increasing the voltage amplitude of the oscillation signal generated by the resonant circuit. However, in a digital handwriting input device, a digital handwriting pen uses a large number of CMOS circuits whose current consumption has a non-linear relationship with a power source voltage. Hence, a curve representing the relationship between the energy value of the signal transmitted by the position detection input device and the power source voltage value of the handwriting pen circuit can be obtained, as shown in FIG. 2. It can be seen from FIG. 2 that, after the energy of the signal transmitted by the position detection input device exceeds a point A in FIG. 2, while the energy of the signal transmitted by the position detection input device continues to increase significantly, the power source only increases by a very limited amount and thus the voltage amplitude of the oscillation signal generated by the resonant circuit also increases by a very limited amount. The power source voltage at the point A is herein referred to as an operation voltage of the power source.

Therefore, after the energy of the signal transmitted by the position detection input device has reached a certain level, even if the energy of the signal transmitted by the position detection input device continues to increase significantly, the voltage amplitude of the oscillation signal generated by the resonant circuit substantially remains in a proximity of the operation voltage of the power source. While it is possible to continue to improve the position detection accuracy by increasing the operation voltage of the CMOS circuit, the sensitivity of the digital handwriting pen decreases as the operation voltage of the CMOS circuit increases. Moreover, the operation voltage of the CMOS circuit cannot be increased sufficiently due to limitation in existing processes for the CMOS circuit.

SUMMARY

It is an object of the present invention to provide a position indication device and a position indication method, capable of improving positioning accuracy of the position indication device without degrading its sensitivity.

In order to achieve the above object, the following solutions are provided according to the embodiments of the present invention.

A position indication device is provided. The device comprises a voltage dividing circuit connected with a resonant circuit and a rectifying and filtering circuit. The voltage dividing circuit obtains a predetermined proportion of a signal output from the resonant circuit and outputs it to the rectifying and filtering circuit.

A position indication method is provided. The method comprises: obtaining a predetermined proportion of a signal output from a resonant circuit and outputting it to a rectifying and filtering circuit.

With the position indication device and position indication method according to the embodiments of the present invention, a predetermined proportion of a signal output from the resonant circuit is obtained and outputted to the rectifying and filtering circuit, such that the proportion of the voltage across the resonant circuit to the output voltage of the rectifying and filtering circuit equals to the predetermined proportion. That is, the proportion of the voltage amplitude of the signal generated by the position indication device to the operation voltage of the CMOS circuit equals to the predetermined proportion. In this way, the voltage amplitude of the signal generated by the position indication device can reach a relatively high value even if the operation voltage of the CMOS circuit is relatively low. Therefore, it is possible to increase the voltage amplitude of the signal generated by the position indication device without degrading its sensitivity. In turn, it is possible to improve positioning accuracy of the position indication device without degrading its sensitivity.

BRIEF DESCRIPTION OF THE DRAWINGS

For clear illustration of the solutions according to the embodiments of the present invention, the figures used for describing the embodiments will be briefly introduced in the following. Obviously, the figures described below are only some of the embodiments of the present invention. Starting from these figures, those skilled in the art can obtain other figures without applying any inventive skills.

FIG. 2 is a curve representing a relationship between an energy value of a signal transmitted by a position detection input device and a power source voltage value of a handwriting pen circuit;

FIG. 3 is a circuit block diagram of a handwriting pen according to an embodiment of the present invention;

DETAILED DESCRIPTION OF THE EMBODIMENTS

Figure 1:
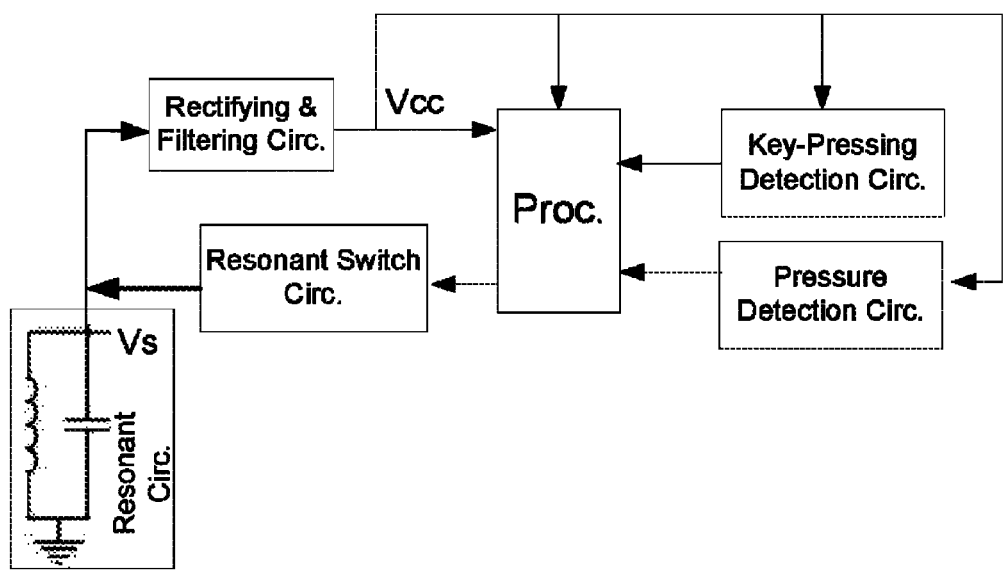
FIG. 1 is a circuit block diagram of a conventional handwriting pen.

In the following, the solutions according to the embodiments of the present invention will be described clearly and fully with reference to the figures. Obviously, the embodiments described below are only some, rather than all, of the embodiments. Starting from the embodiments of the present invention, those skilled in the art can obtain other embodiments with applying any inventive skills. All these embodiments are to be encompassed by the scope of the present invention.

In order to improve positioning accuracy of a position indication device without degrading its sensitivity, a position indication device is provided according to an embodiment of the present invention. The device comprises a voltage dividing circuit connected with a resonant circuit and a rectifying and filtering circuit. The voltage dividing circuit obtains a predetermined proportion of a signal output from the resonant circuit and outputs it to the rectifying and filtering circuit.

Here the resonant circuit consists of an inductor and a capacitor and is capable of generating an oscillation signal in response to sensing a signal transmitted from a position detection input device. The rectifying and filtering circuit receives a signal output from the voltage dividing circuit, rectifies and filters the signal to obtain a DC voltage as a power source for the remaining circuits of the position indication device. Further, the remaining circuits may include a number of circuits such as a processor and a resonant switch circuit. Details of these circuits, such as their combinations and connections, are within the knowledge of one skilled in the art and the description thereof will thus be omitted here.

In an embodiment of the present invention, the position indication device can be a digital handwriting pen, which can be used with a position detection input device such as a handwriting panel, a handwriting liquid crystal screen or an electronic whiten board.

The voltage dividing circuit can be implemented in various ways. For example, the voltage dividing circuit can be a circuit consisting of two series-connected capacitors and is connected in parallel with the resonant circuit. Further, one end of the rectifying and filtering circuit is connected to a connection point between the two capacitors. The other end of the rectifying and filtering circuit is connected to the remaining circuits of the position indication device.

Alternatively, the voltage dividing circuit can be a circuit consisting of two series-connected resistors and is connected in parallel with the resonant circuit. Further, one end of the rectifying and filtering circuit is connected to a connection point between the two resistors. The other end of the rectifying and filtering circuit is connected to the remaining circuits of the position indication device.

Alternatively, the voltage dividing circuit can be a circuit consisting of two series-connected inductors and is connected in parallel with the resonant circuit. Further, one end of the rectifying and filtering circuit is connected to a connection point between the two inductors. The other end of the rectifying and filtering circuit is connected to the remaining circuits of the position indication device.

Alternatively, the voltage dividing circuit can be a circuit consisting of an inductor having a central tap and is connected in parallel with the resonant circuit. Further, one end of the rectifying and filtering circuit is connected to the central tap of the inductor. The other end of the rectifying and filtering circuit is connected to the remaining circuits of the position indication device.

With the position indication device according to the embodiments of the present invention, a predetermined proportion of a signal output from the resonant circuit is obtained and outputted to the rectifying and filtering circuit, such that the proportion of the voltage across the resonant circuit to the output voltage of the rectifying and filtering circuit equals to the predetermined proportion. That is, the proportion of the voltage amplitude of the signal generated by the position indication device to the operation voltage of the CMOS circuit equals to the predetermined proportion. In this way, the voltage amplitude of the signal generated by the position indication device can reach a relatively high value even if the operation voltage of the CMOS circuit is relatively low. Therefore, it is possible to increase the voltage amplitude of the signal generated by the position indication device without degrading its sensitivity. In turn, it is possible to improve positioning accuracy of the position indication device without degrading its sensitivity.

In the above embodiment, the voltage dividing circuit can be consist of two series-connected capacitors, two series-connected resistors, two series-connected inductors or an inductor having a central tap. In the following, different situations of the above embodiment will be further detailed in connection with an example of a handwriting pen.

Referring to FIG. 3, a handwriting pen is provided in this embodiment. The handwriting pen includes a resonant circuit 101, a voltage dividing circuit 102, a rectifying and filtering circuit 103, a processor 104, a key-pressing detection circuit 105, a pressure detection circuit 106 and a resonant switch circuit 107.

Here, the resonant circuit 101 consists of a capacitor and an inductor. The resonant circuit 101 has one end grounded and the other end connected to the resonant switching circuit 107. The voltage dividing circuit 102 is connected in parallel with the resonant circuit 101 and includes a first capacitor C1 and a second capacitor C2 that are connected in series. The rectifying and filtering circuit 103 is connected to a connection point between the first capacitor C1 and the second capacitor C2. The rectifying and filtering circuit 103 is connected to the processor 104, the key-pressing detection circuit 105 and the pressure detection circuit 106. The processor 104 is connected to the key-pressing detection circuit 105, the pressure detection circuit 106 and the resonant switch circuit 107.

The resonant circuit 101 generates an oscillation signal in response to sensing a signal transmitted from a position detection input device. The voltage dividing circuit 102 obtains a portion of the signal between the capacitors and outputs it to the rectifying and filtering circuit 103. The rectifying and filtering circuit 103 rectifies and filters the signal outputted from the voltage dividing circuit 102 to obtain a DC voltage and supplies power to the remaining circuits. The key-pressing circuit 105 detects whether a key is pressed and transmits its detection result to the processor 104. The pressure detection circuit 106 detects a pressure applied to the tip of the handwriting pen and transmits the detected pressure value to the processor 104. Upon receiving these detection results, the processor 104 encodes them digitally and controls the resonant circuit 101 to oscillate or not to oscillate with the resonant switch circuit 107, so as to transmit the digitally encoded information to the position detection input device.

In this embodiment, it is assumed that the power source voltage provided by the rectifying and filtering circuit 103 is Vcc, the peak value of the voltage amplitude of the signal generated by the resonant circuit 101 is Vs and the voltage of the first capacitor C1 is Vs1. It is further assumed that the capacitance of the second capacitor C2 is n times larger than that of the first capacitor C1, i.e., C2=n*C1. It can be derived based on circuit theory that Vs=(n+1)*Vs1 and the power source voltage Vcc=Vs1. Thus, Vs=(n+1)*Vcc. That is, in this case the peak value of the signal generated by the resonant circuit 101 is n+1 times larger than the power source voltage.

While the energy of the signal provided to the rectifying and filtering circuit as shown in FIG. 3 is lower than the energy of the signal provided to the rectifying and filtering circuit as shown in FIG. 1, it can be seen from the relationship between the signal energy level and the power source voltage shown in FIG. 2 that, as long as the energy of the signal generated by the resonant circuit reaches a certain level, the power source voltage can exceed the point A in FIG. 2. At this time, the power source voltage remains substantially the same, i.e., approximately equal to the operation voltage of the CMOS circuit. In this way, Vs1 in FIG. 3 approximately equals to Vs in FIG. 1. Hence, the voltage across the resonant circuit in FIG. 3 is approximately n+1 times larger than the voltage across the resonant circuit in FIG. 1. In this way, the voltage amplitude of the signal generated by the handwriting pen can be increased.

In addition, a CMOS device having a low operation voltage can be used to enhance the sensitivity of the digital handwriting pen. At the same time, by simply adjusting the ratio of the capacitance of the first capacitor C1 to the capacitance of the second capacitor C2, the voltage amplitude of the signal generated by the handwriting pen can reach a high value, thereby improving the accuracy of position of the handwriting pen.

Figure 4:
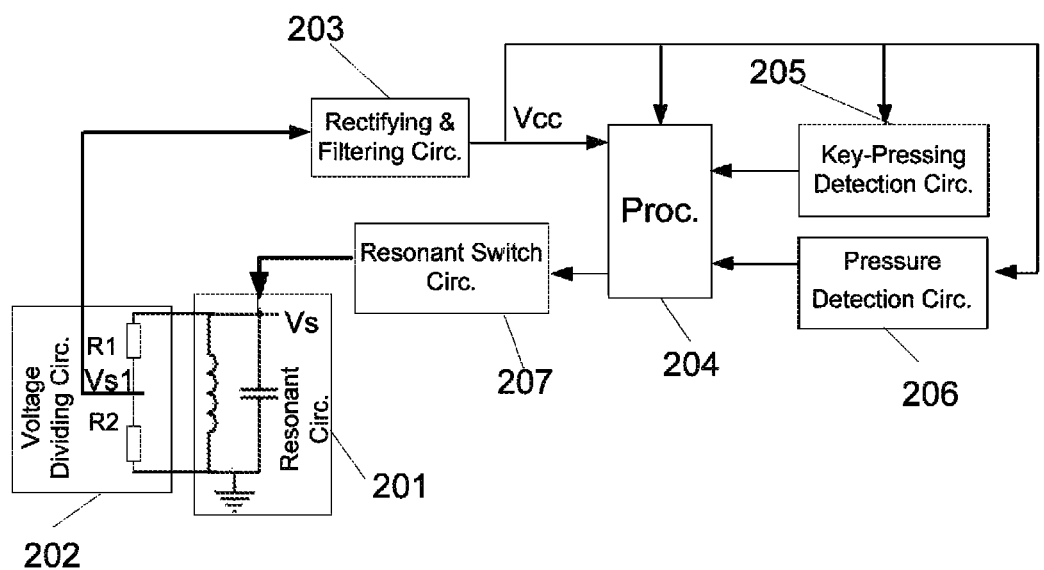
FIG. 4 is a circuit block diagram of a handwriting pen according to another embodiment of the present invention.

Referring to FIG. 4, a handwriting pen is provided in this embodiment. The handwriting pen includes a resonant circuit 201, a voltage dividing circuit 202, a rectifying and filtering circuit 203, a processor 204, a key-pressing detection circuit 205, a pressure detection circuit 206 and a resonant switch circuit 207.

Here, the resonant circuit 201 consists of a capacitor and an inductor. The resonant circuit 201 has one end grounded and the other end connected to the resonant switching circuit 207. The voltage dividing circuit 202 is connected in parallel with the resonant circuit 201 and includes a first resistor R1 and a second resistor R2 that are connected in series. The rectifying and filtering circuit 203 is connected to a connection point between the first resistor R1 and the second resistor R2. The rectifying and filtering circuit 203 is connected to the processor 204, the key-pressing detection circuit 205 and the pressure detection circuit 206. The processor 204 is connected to the key-pressing detection circuit 205, the pressure detection circuit 206 and the resonant switch circuit 207.

The resonant circuit 201 generates an oscillation signal in response to sensing a signal transmitted from a position detection input device. The voltage dividing circuit 202 obtains a portion of the signal between the resistors and outputs it to the rectifying and filtering circuit 203. The rectifying and filtering circuit 203 rectifies and filters the signal outputted from the voltage dividing circuit 202 to obtain a DC voltage and supplies power to the remaining circuits. The key-pressing circuit 205 detects whether a key is pressed and transmits its detection result to the processor 204. The pressure detection circuit 206 detects a pressure applied to the tip of the handwriting pen and transmits the detected pressure value to the processor 204. Upon receiving these detection results, the processor 204 encodes them digitally and controls the resonant circuit 201 to oscillate or not to oscillate with the resonant switch circuit 207, so as to transmit the digitally encoded information to the position detection input device.

In this embodiment, it is assumed that the power source voltage provided by the rectifying and filtering circuit 203 is Vcc, the peak value of the voltage amplitude of the signal generated by the resonant circuit 201 is Vs and the voltage of the first resistor R1 is Vs1. It is further assumed that the resistance of the first resistor R1 is n times larger than that of the second resistor R2, i.e., R1=n*R2. It can be derived based on circuit theory that Vs=(n+1)*Vs1 and the power source voltage Vcc=Vs1. Thus, Vs=(n+1)*Vcc. That is, in this case the peak value of the signal generated by the resonant circuit 201 is n+1 times larger than the power source voltage.

While the energy of the signal provided to the rectifying and filtering circuit as shown in FIG. 4 is lower than the energy of the signal provided to the rectifying and filtering circuit as shown in FIG. 1, it can be seen from the relationship between the signal energy level and the power source voltage shown in FIG. 2 that, as long as the energy of the signal generated by the resonant circuit reaches a certain level, the power source voltage can exceed the point A in FIG. 2. At this time, the power source voltage remains substantially the same, i.e., approximately equal to the operation voltage of the CMOS circuit. In this way, Vs1 in FIG. 4 approximately equals to Vs in FIG. 1. Hence, the voltage across the resonant circuit in FIG. 4 is approximately n+1 times larger than the voltage across the resonant circuit in FIG. 1. In this way, the voltage amplitude of the signal generated by the handwriting pen can be increased.

In addition, a CMOS device having a low operation voltage can be used to enhance the sensitivity of the digital handwriting pen. At the same time, by simply adjusting the ratio of the resistance of the first resistor R1 to the resistance of the second resistor R2, the voltage amplitude of the signal generated by the handwriting pen can reach a high value, thereby improving the accuracy of position of the handwriting pen.

Figure 5:
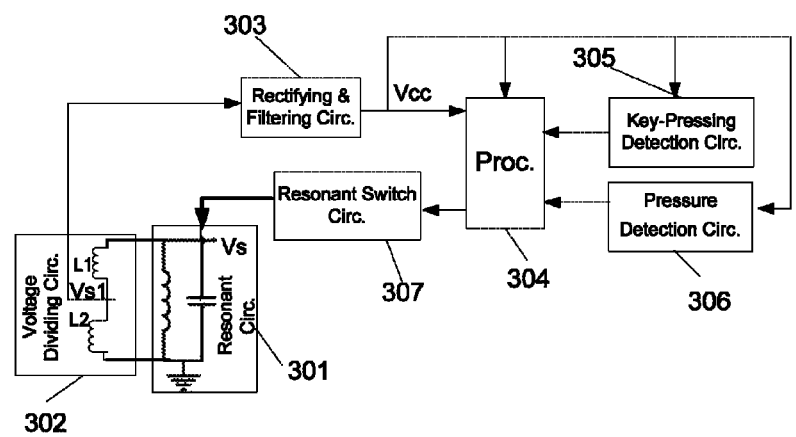
FIG. 5 is a circuit block diagram of a handwriting pen according to yet another embodiment of the present invention.

Referring to FIG. 5, a handwriting pen is provided in this embodiment. The handwriting pen includes a resonant circuit 301, a voltage dividing circuit 302, a rectifying and filtering circuit 303, a processor 304, a key-pressing detection circuit 305, a pressure detection circuit 306 and a resonant switch circuit 307.

Here, the resonant circuit 301 consists of a capacitor and an inductor. The resonant circuit 301 has one end grounded and the other end connected to the resonant switching circuit 307. The voltage dividing circuit 302 is connected in parallel with the resonant circuit 301 and includes a first inductor L1 and a second inductor L2 that are connected in series. The rectifying and filtering circuit 303 is connected to a connection point between the first inductor L1 and the second inductor L2. The rectifying and filtering circuit 303 is connected to the processor 304, the key-pressing detection circuit 305 and the pressure detection circuit 306. The processor 304 is connected to the key-pressing detection circuit 305, the pressure detection circuit 306 and the resonant switch circuit 307.

The resonant circuit 301 generates an oscillation signal in response to sensing a signal transmitted from a position detection input device. The voltage dividing circuit 302 obtains a portion of the signal between the inductors and outputs it to the rectifying and filtering circuit 303. The rectifying and filtering circuit 303 rectifies and filters the signal outputted from the voltage dividing circuit 302 to obtain a DC voltage and supplies power to the remaining circuits. The key-pressing circuit 305 detects whether a key is pressed and transmits its detection result to the processor 304. The pressure detection circuit 306 detects a pressure applied to the tip of the handwriting pen and transmits the detected pressure value to the processor 304. Upon receiving these detection results, the processor 304 encodes them digitally and controls the resonant circuit 301 to oscillate or not to oscillate with the resonant switch circuit 307, so as to transmit the digitally encoded information to the position detection input device.

In this embodiment, it is assumed that the power source voltage provided by the rectifying and filtering circuit 303 is Vcc, the peak value of the voltage amplitude of the signal generated by the resonant circuit 301 is Vs and the voltage of the first inductor L1 is Vs1. It is further assumed that the inductance of the first inductor L1 is n times larger than that of the second inductor L2, i.e., L1=n*L2. It can be derived based on circuit theory that Vs=(n+1)*Vs1 and the power source voltage Vcc=Vs1. Thus, Vs=(n+1)*Vcc. That is, in this case the peak value of the signal generated by the resonant circuit 301 is n+1 times larger than the power source voltage.

While the energy of the signal provided to the rectifying and filtering circuit as shown in FIG. 5 is lower than the energy of the signal provided to the rectifying and filtering circuit as shown in FIG. 1, it can be seen from the relationship between the signal energy level and the power source voltage shown in FIG. 2 that, as long as the energy of the signal generated by the resonant circuit reaches a certain level, the power source voltage can exceed the point A in FIG. 2. At this time, the power source voltage remains substantially the same, i.e., approximately equal to the operation voltage of the CMOS circuit. In this way, Vs1 in FIG. 5 approximately equals to Vs in FIG. 1. Hence, the voltage across the resonant circuit in FIG. 5 is approximately n+1 times larger than the voltage across the resonant circuit in FIG. 1. In this way, the voltage amplitude of the signal generated by the handwriting pen can be increased.

In addition, a CMOS device having a low operation voltage can be used to enhance the sensitivity of the digital handwriting pen. At the same time, by simply adjusting the ratio of the inductance of the first inductor L1 to the inductance of the second inductor L2, the voltage amplitude of the signal generated by the handwriting pen can reach a high value, thereby improving the accuracy of position of the handwriting pen.

Figure 6:
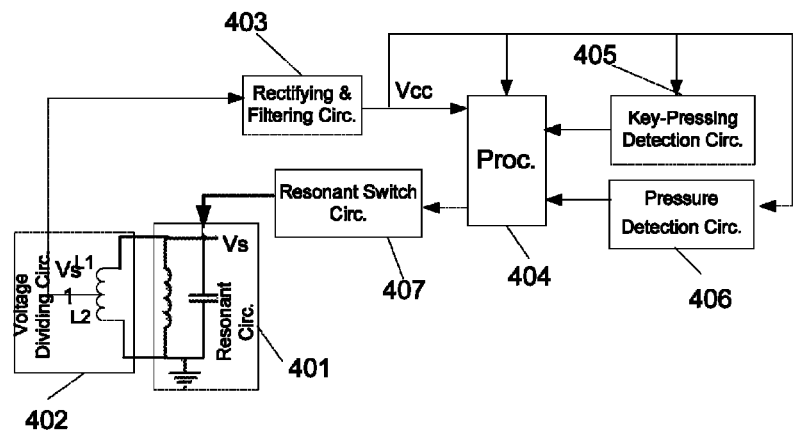
FIG. 6 is a circuit block diagram of a handwriting pen according to a further embodiment of the present invention.

Referring to FIG. 6, a handwriting pen is provided in this embodiment. The handwriting pen includes a resonant circuit 401, a voltage dividing circuit 402, a rectifying and filtering circuit 403, a processor 404, a key-pressing detection circuit 405, a pressure detection circuit 406 and a resonant switch circuit 407.

Here, the resonant circuit 401 consists of a capacitor and an inductor. The resonant circuit 401 has one end grounded and the other end connected to the resonant switching circuit 407. The voltage dividing circuit 402 is connected in parallel with the resonant circuit 401 and includes an inductor L having a central tap. The rectifying and filtering circuit 403 is connected to the central tap of the inductor L. The rectifying and filtering circuit 403 is connected to the processor 404, the key-pressing detection circuit 405 and the pressure detection circuit 406. The processor 404 is connected to the key-pressing detection circuit 405, the pressure detection circuit 406 and the resonant switch circuit 407.

The resonant circuit 401 generates an oscillation signal in response to sensing a signal transmitted from a position detection input device. The voltage dividing circuit 402 obtains a portion of the signal from the middle of the inductor and outputs it to the rectifying and filtering circuit 403. The rectifying and filtering circuit 403 rectifies and filters the signal outputted from the voltage dividing circuit 402 to obtain a DC voltage and supplies power to the remaining circuits. The key-pressing circuit 405 detects whether a key is pressed and transmits its detection result to the processor 404. The pressure detection circuit 406 detects a pressure applied to the tip of the handwriting pen and transmits the detected pressure value to the processor 404. Upon receiving these detection results, the processor 404 encodes them digitally and controls the resonant circuit 401 to oscillate or not to oscillate with the resonant switch circuit 407, so as to transmit the digitally encoded information to the position detection input device.

In this embodiment, it is assumed that the power source voltage provided by the rectifying and filtering circuit 403 is Vcc, the peak value of the voltage amplitude of the signal generated by the resonant circuit 401 is Vs and the voltage of the first inductor L1 is Vs1. It is further assumed that the inductance L1 of the portion of the inductor L that is connected in parallel with the rectifying and filtering circuit is n times larger than that of the remaining portion of the inductor, i.e., L1=n*L2. It can be derived based on circuit theory that Vs=(n+1)*Vs1 and the power source voltage Vcc=Vs1. Thus, Vs=(n+1)*Vcc. That is, in this case the peak value of the signal generated by the resonant circuit 401 is n+1 times larger than the power source voltage.

While the energy of the signal provided to the rectifying and filtering circuit as shown in FIG. 6 is lower than the energy of the signal provided to the rectifying and filtering circuit as shown in FIG. 1, it can be seen from the relationship between the signal energy level and the power source voltage shown in FIG. 2 that, as long as the energy of the signal generated by the resonant circuit reaches a certain level, the power source voltage can exceed the point A in FIG. 2. At this time, the power source voltage remains substantially the same, i.e., approximately equal to the operation voltage of the CMOS circuit. In this way, Vs1 in FIG. 6 approximately equals to Vs in FIG. 1. Hence, the voltage across the resonant circuit in FIG. 6 is approximately n+1 times larger than the voltage across the resonant circuit in FIG. 1. In this way, the voltage amplitude of the signal generated by the handwriting pen can be increased.

In addition, a CMOS device having a low operation voltage can be used to enhance the sensitivity of the digital handwriting pen. At the same time, by simply adjusting the ratio between the two portions of the inductor L that are delimited by the central tap, the voltage amplitude of the signal generated by the handwriting pen can reach a high value, thereby improving the accuracy of position of the handwriting pen.

A position indication method corresponding to the above device is also provided. The method includes: obtaining a predetermined proportion of a signal output from a resonant circuit and outputting it to a rectifying and filtering circuit.

In this embodiment, the dividing circuit can consist of two capacitors that are connected in series, and can be connected in parallel with the resonant circuit. One end of the rectifying and filtering circuit is connected to a connection point between the two capacitors.

Alternatively, the dividing circuit can consist of two resistors that are connected in series, and can be connected in parallel with the resonant circuit. One end of the rectifying and filtering circuit is connected to a connection point between the two resistors.

Alternatively, the dividing circuit can consist of two inductors that are connected in series, and can be connected in parallel with the resonant circuit. One end of the rectifying and filtering circuit is connected to a connection point between the two inductors.

Alternatively, the dividing circuit can be an inductor having a central tap, and can be connected in parallel with the resonant circuit. One end of the rectifying and filtering circuit is connected to the central tap of the inductor.

With the position indication method according to the embodiments of the present invention, a predetermined proportion of a signal output from the resonant circuit is obtained and outputted to the rectifying and filtering circuit, such that the proportion of the voltage across the resonant circuit to the output voltage of the rectifying and filtering circuit equals to the predetermined proportion. That is, the proportion of the voltage amplitude of the signal generated by the position indication device to the operation voltage of the CMOS circuit equals to the predetermined proportion. In this way, the voltage amplitude of the signal generated by the position indication device can reach a relatively high value even if the operation voltage of the CMOS circuit is relatively low. Therefore, it is possible to increase the voltage amplitude of the signal generated by the position indication device without degrading its sensitivity. In turn, it is possible to improve positioning accuracy of the position indication device without degrading its sensitivity.

It can be appreciated by those skilled in the art that some or all of the steps in the method embodiment as described above can be implemented by hardware following instructions of a program. Such program can be stored in a computer readable storage medium and, when executed, performs the steps of the above method embodiment. The storage medium may be a magnetic disk, an optical disc, a Read Only Memory (ROM), or a Random Access Memory (RAM).

While the embodiments of the present invention have been described above, the scope of the present invention is not limited to these embodiments. Those skilled in the art can make further modifications and changes to these embodiments without departing from the scope of the present invention. These modifications and changes are to be encompassed by the scope of the present invention. Therefore, the scope of the present invention is defined only by the claims as attached.

What is claimed is:

1. A position indication device, comprising:
a processor;
a resonant switch circuit;
a resonant circuit;
a rectifying and filtering circuit; and
a voltage dividing circuit connected with the resonant circuit and the rectifying and filtering circuit,
wherein the voltage dividing circuit is configured to obtain a predetermined proportion of a signal output from the resonant circuit and output it to the rectifying and filtering circuit;
wherein the rectifying and filtering circuit is configured to receive the signal output from the voltage dividing circuit, and apply rectifying and filtering on the signal to obtain a DC voltage as a power source for both the processor and the resonant switch circuit; and
wherein the dividing circuit is connected in parallel with the resonant circuit and comprises a first inductor and a second inductor that are connected in series, and wherein one end of the rectifying and filtering circuit is connected to a connection point between the first inductor and the second inductor.

2. A position indication device, comprising:
a processor;
a resonant switch circuit;
a resonant circuit;
a rectifying and filtering circuit; and
a voltage dividing circuit connected with the resonant circuit and the rectifying and filtering circuit,
wherein the voltage dividing circuit is configured to obtain a predetermined proportion of a signal output from the resonant circuit and output it to the rectifying and filtering circuit;
wherein the rectifying and filtering circuit is configured to receive the signal output from the voltage dividing circuit, and apply rectifying and filtering on the signal to obtain a DC voltage as a power source for both the processor and the resonant switch circuit; and
wherein the dividing circuit is connected in parallel with the resonant circuit and comprises an inductor having a central tap, and wherein one end of the rectifying and filtering circuit is connected to the central tap of the inductor.

3. A position indication method for a position indication device comprising a processor, a resonant switch circuit, a resonant circuit, a rectifying and filtering circuit, and a voltage dividing circuit connected with the resonant circuit and the rectifying and filtering circuit, the method comprising:
obtaining a predetermined proportion of a signal output from the resonant circuit and outputting it to the rectifying and filtering circuit;
receiving, by the rectifying and filtering circuit, the signal output from the voltage dividing circuit, and
applying, by the rectifying and filtering circuit, rectifying and filtering on the signal to obtain a DC voltage as a power source for both the processor and the resonant switch circuit;
wherein the dividing circuit is connected in parallel with the resonant circuit and comprises a first inductor and a second inductor that are connected in series, and wherein one end of the rectifying and filtering circuit is connected to a connection point between the first inductor and the second inductor.

4. A position indication method for a position indication device comprising a processor, a resonant switch circuit, a resonant circuit, a rectifying and filtering circuit, and a voltage dividing circuit connected with the resonant circuit and the rectifying and filtering circuit, the method comprising:
- obtaining a predetermined proportion of a signal output from the resonant circuit and outputting it to the rectifying and filtering circuit;
- receiving, by the rectifying and filtering circuit, the signal output from the voltage dividing circuit, and
- applying, by the rectifying and filtering circuit, rectifying and filtering on the signal to obtain a DC voltage as a power source for both the processor and the resonant switch circuit;
- wherein the dividing circuit is connected in parallel with the resonant circuit and comprises an inductor having a central tap, and wherein one end of the rectifying and filtering circuit is connected to the central tap of the inductor.

* * * * *